No. 740,771. PATENTED OCT. 6, 1903.
T. McINTYRE.
GAS COMPRESSING MACHINE.
APPLICATION FILED MAY 27, 1901.
NO MODEL.
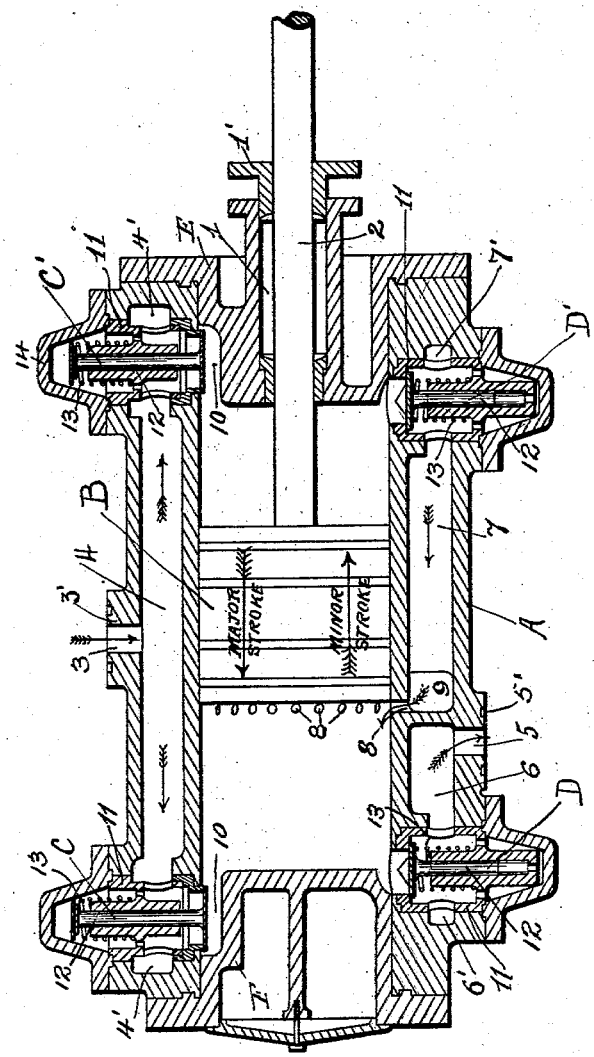
Witnesses:
Harvey L Hanson
Max W Zabel
Inventor.
Thomas McIntyre.
By Charles A. Brown, Cragg & Belfield
Attorneys.

No. 740,771. Patented October 6, 1903.

UNITED STATES PATENT OFFICE.

THOMAS McINTYRE, OF ADELAIDE, SOUTH AUSTRALIA, AUSTRALIA.

GAS-COMPRESSING MACHINE.

SPECIFICATION forming part of Letters Patent No. 740,771, dated October 6, 1903.

Application filed May 27, 1901. Serial No. 62,140. (No model.)

*To all whom it may concern:*

Be it known that I, THOMAS MCINTYRE, a resident of the city of Adelaide, in the State of South Australia, Australia, have invented certain new and useful Improvements in Gas-Compressors, of which the following is a specification.

My invention relates to horizontal and vertical reciprocatory gas-compressors, and has special reference to compressors of the double-acting type.

The object of my invention is to provide a simple, cheap, and efficient gas-compressor.

There are two well-known kinds of reciprocatory or piston gas-compressors—the single-acting and the double-acting. The single-acting machine compresses gas during only one stroke and is cumbersome and inefficient compared with a double-acting machine of equal capacity; yet when it is attempted to secure increased capacity by having the piston compress gas during both strokes several objectionable features are encountered, particularly the piston-rod packing and the entailed system of forced lubrication.

A particular object of this invention is to provide a double-acting gas-compressor wherein the gas shall be subjected to an initial or minor pressure only in the piston-rod end of the cylinder and shall be subjected to its final compression in the other end of the cylinder, which is tightly closed except for its inlet and outlet valves.

Another object of the invention, dependent upon the foregoing, is to provide a double-acting compressor in the gland or stuffing-box, whereby ordinary packing may be used without loss or leakage of gas.

Many double-acting gas-compressors are further objectionable because it is necessary to disconnect the several gas-pipes from the cylinder and from the valves before the cylinder-heads can be removed, and, further, many compressors have their valves so arranged that even these cannot be removed for inspection or repair without disturbing said gas connections of the compressor. As all connections must be perfectly tight, the necessity for their frequent removal occasions much inconvenience and annoyance, and a particular object of this invention is to provide a double-acting gas-compressor of such construction and arrangement of its parts and valves that the gas connections may be made permanent and need not be disturbed when it is desired to remove either a cylinder-head or any of the valves. Again, many double-acting compressors are provided with several external by-passes or ducts jointed to the cylinder and to the valves and which are not only costly of manufacture, but present a number of connections and joints that are liable to leak, and thus greatly reduce the efficiency of the machine. Recognizing this, a special object of this invention is to provide a double-acting gas-compressor wherein all of the gas ducts and passes shall be contained within the integral walls of the compressor-cylinder.

With these objects in view my invention consists, primarily, in a gas-compressor which comprises a cylinder closed by suitable heads and containing a piston having a piston-rod which extends through a gland in one of the heads and is suitably packed therein, in combination with inlet-valves provided at opposite ends of the cylinder, a valved by-pass extending from the gland end of said cylinder to an internal port or ports in the cylinder, adapted to be closed by said piston, and a discharge-valve in the opposite end of said cylinder, whereby the piston when reciprocated subjects the gas to initial compression in the gland end of the cylinder and forces the gas through said ports into the closed end of the cylinder and thereafter subjects the gas to final compression in said closed end, the gas being discharged through said discharge-valve; and my invention consists, further, in a double-acting gas-compressor the cylinder-walls of which are provided with gas-ducts and valve-spaces, in combination with valves provided therein and gas connections upon the cylinder communicating with said ducts; and, further, my invention consists in various details of construction and in combinations of parts, all as hereinafter described, and particularly pointed out in the claims.

In the way of carrying out my invention herein set forth I arrange for the action of the piston during both strokes and establish communication between the two ends of the cylinder at a time when the piston has traveled a portion of its stroke toward the gland end of the cylinder. The gas is therefore compressed during the entire stroke of the piston away from the gland end and is compressed during a portion of the stroke toward that end, but during only a portion of such stroke. By this portion of the return or minor stroke the gas is compressed to a pressure higher than its original or intake pressure, but lower than that to which it is compressed by the forward or major stroke, and when this pressure has been reached communication is established between the opposite ends of the cylinder, and the gas which has been compressed escapes to the forward end thereof. The minor stroke of the piston toward the gland is thus utilized for compressing gas and at the same time the gland of the cylinder is not subjected to the full pressure of the system, but only to any predetermined lower pressure. Thus while the machine operates upon both strokes of the piston the gland is relieved from the objectionable strain incident to the high pressure of the refrigerating or other system that is connected with the cylinder and no oil system is required. Communication can be established between the two ends of the cylinder at any point in the stroke of the piston toward the gland and the gland thus subjected to any desired predetermined pressure less than the pressure of the system.

My invention will be more readily understood by reference to the accompanying drawing, forming a part of this specification, in which—

A represents a thick-walled cylinder. The walls of this cylinder contain the ducts 4 and 6 and 7 and the valve-spaces 4' 4' and 6' and 7', respectively. The cylinder-walls also contain the circumferential duct 9, which nearly surrounds the cylinder, being interrupted only by the walls of the duct 4. This circumferential duct 9 opens into the duct 7 and also communicates with the interior of the cylinder through a plurality of small internal ports 8, provided in the inner wall of the cylinder.

3 represents the gas-inlet opening communicating with the duct 4, and 5 represents the gas-discharge opening leading from the duct 6. The gas-pipe connections 3' and 5' are preferably integral with the cylinder and have packing-grooves, as shown. The ends of the cylinder are closed by the gland-head E and by the tight head F. These extend some distance into the cylinder and are provided with clearance-spaces 10 10 opposite the valve-openings.

B represents the piston, whereof 2 is the piston-rod. The piston-rod reciprocates in the gland 1, whereof 1' is the follower. The gland is filled with any suitable packing.

C and C' are the inlet-valves through which the gas is drawn from the duct 4 into opposite ends of the cylinder.

D is the discharge-valve through which the gas at final pressure is discharged into the duct 6, and D' is the intermediate check-valve through which gas under initial pressure is discharged into the duct or by-pass 7, wherefrom the gas escapes through the duct 9 and ports 8 into the discharge end of the cylinder. The inlet-valves open inward, while the valves D and D' open outward; otherwise the inlet and discharge valves differ but little in construction. Each valve has a valve-casing 11, in which the stem 12 of the valve is guided, and each is provided with a spring 13, tending to hold the valve closed against pressure from the exterior or the interior of the cylinder, as the case may be. The valve-casings are seated tightly in the walls of the annular spaces 4', 7', and 6' and are provided with side openings which communicate with respective ducts. For each valve-space there is a valve hood or cap 14, which, tightly packed and secured upon the cylinder, prevents the escape of gas. These hoods are only removed when it is desired to inspect, adjust, or repair the valves, and it will be observed that the valves and also the heads of the cylinder may be taken off without disturbing the inlet and discharge connections or pipes, (not shown,) which are permanently coupled to the cylinder connections 3' and 5'. It will be noted that in a compressor of the construction shown the valve clearance-spaces are very small—an essential in an efficient compressor. To reduce the clearance-space at the intermediate valve D', I arrange the same close to the head E. Except for this reason the valve might be placed at any other point in the duct 7, being in effect a check-valve intermediate of the ends of the cylinder. I prefer to employ a large number of the circumferential by-pass ports 8, and though of small diameter they together approximate the area of the valve-opening of the valve D' and may exceed such area to provide for the quick relief of the gas under pressure in duct 7. These ports 8 are closed during part of the time that the piston B is in motion, and their location between the ends of the cylinder and also the location and the size of the circumferential duct 9 and the duct 7 are determined by the ratio of pressures to be created in opposite ends of the cylinder. Within certain limits this location may be varied according to the requirements of the gas system for which the compressor is designed, but is practically determined by the pressure that may be imposed upon the packing-gland 1 without disturbing the packing or causing the gland to leak. A higher pressure would make it necessary to use a gland and packing of special constructions, which it is the object of this invention to avoid. The foregoing will be obvious when it is understood that the gas compressed in the gland end of the cylinder cannot escape therefrom until the holes or ports 8 are opened by the passing of the piston. Hence the nearness of said ports to the gland-head determines the maximum pressure attained in the initial compression of the gas and to which the gland is exposed. In this connection it should be noted that the distance between the ports 8 and the closed or tight head F should not exceed the length of the piston—that is, I prefer that the ports 8 shall remain closed at the end of the stroke of the piston; otherwise the compressed gas that is trapped in the intermediate receiving chamber or duct 7 and the duct 9 during the movement of the piston toward the closed end of the cylinder would be allowed to return into the gland end of the cylinder. In practice and as shown in the drawing the duct 9 is considerably wider than the ports 8, so that in boring the ports their location may be fixed according to given conditions and the particular service in which the compressor is to be used. Obviously the position of the circumferential duct 9 may, if necessary, be readily changed by altering the position of the core in the mold before casting the cylinder. I am thus able to construct and cheaply adapt my compressors for different pressures and uses.

The operation of my novel compressor is as follows: The major pressure-stroke of the piston toward the closed or tight head F of the cylinder operates to draw gas into the gland end of the cylinder through the valve C', the intermediate or check-valve D' in the by-pass 7 being then closed by the back pressure of gas in said duct 7. At the same time the piston during its major stroke compresses the gas in the closed end of the cylinder and discharges the same through the outlet-valve D against the pressure of the gas holder or system which is connected with the discharge-opening 5, the valve C being then shut. When the piston begins its minor pressure-stroke toward the end of the cylinder which contains the gland 1, the valve D will close and new gas will rush in through the valve C, filling the cylinder behind the retiring piston. This indraft of gas will continue until the piston has moved far enough to uncover the holes 8 and permit the entrance of gas from the duct 7. Meantime the gas in the gland end of the cylinder, being confined by the closing of the valve C', will be compressed to an extent proportionate to the displacement of the piston and will thereafter find its exit through the valve D' and the duct 7, duct 9, and ports 8, from which the gas will begin to discharge into the opposite end of the cylinder as soon as the holes or ports 8 are uncovered. The passing of the gas from one end of the cylinder to the other will continue thereafter during the continued minor pressure-stroke of the piston—that is, until the piston reaches the piston-head E. When the piston pauses, the valve D' will instantly seat itself and block the return of gas from the duct 7 through said valve. At this moment the cylinder will be full of gas at the minor or initial pressure minus the loss of pressure occasioned by the admixture of the initially-compressed gas with the gas just drawn into the closed or high-pressure end of the cylinder, as above explained. Upon the next major stroke of the piston the gas will finally be compressed in the closed end of the cylinder, being discharged through the valve D from the moment that the pressure in the cylinder overcomes that of the system to which the machine is connected. Meantime fresh gas is taken into the gland end of the cylinder. The pressure of gas in the duct 7 approximates the maximum initial pressure, and as the capacity of the ducts 7 and 9 is large I prefer that the ports 8 shall not be opened at or before the end of the major stroke of the piston, as in that case the compressed gas in the duct would be permitted to return into the low-pressure end of the cylinder, with consequent loss of energy.

As numerous modifications of my invention will readily suggest themselves to one skilled in the art, I do not confine this invention to the specific constructions herein shown and described.

Having thus described my invention, I claim as new and desire to secure by Letters Patent—

1. In a gas-compressor, the cylinder, provided with suitable heads, one tight and the other containing a gland, in combination with the piston having a piston-rod extending through said gland, the inlet-valves of said cylinder, a high-pressure discharge-valve distant from the gland end of the cylinder, the low-pressure discharge-valve at the gland end of the cylinder, a by-pass leading therefrom and discharging into the opposite end of the cylinder and said piston normally and when in movement, preventing the discharge of gas from said by-pass into said opposite end of the cylinder at all times, except during the last part of the minor pressure-stroke of the piston and during the first part of the major pressure-stroke thereof, substantially as described.

2. In a gas-compressor, the cylinder having suitable heads, one tight and the other provided with a gland, in combination with the piston having a piston-rod extending through said gland, the inlet-valves of said cylinder, the high-pressure discharge-valve at the closed end of said cylinder, said cylinder having an intermediate internal port, a valved by-pass leading from the gland end of the cylinder to said intermediate port, and said piston being of such length and stroke and said port being so located that said port is closed during the first part of the suction-stroke in one direction and the last part of the final compression-stroke in the other direction, and vice versa, substantially as described.

3. In a double-acting gas-compressor, the cylinder, closed at its ends, in combination with the reciprocatory piston, the inlet-valves at the ends of said cylinder, the high-pressure discharge-valve at one end of said cylinder, the low-pressure discharge-valve at the other end thereof, said cylinder having a plurality of internal ports which are closed by said piston except during the last part of its compression-stroke in one direction and the first part of its suction-stroke in the other direction and the by-pass connecting said ports and said low-pressure valve, substantially as described.

4. In a double-acting gas-compressor, the cylinder having the heads E and F and containing the circumferentially-arranged internal ports 8, in combination with the inlet-valves, the high-pressure discharge-valve at one end of the cylinder, the low-pressure valve provided at the other end of the cylinder,-a duct provided in the wall of said cylinder, establishing communication between said low-pressure valve and said ports 8, said ports 8 being nearer to said head F than to the head E, and the reciprocating piston provided in said cylinder and closing said ports 8 at all times except during the last part of the compression-stroke of the piston in one direction and the first part of its suction-stroke in the opposite direction, substantially as described.

5. In a double-acting gas-compressor, the cylinder, having closed ends, in combination, with the reciprocatory piston, the inlet-valves at the ends of said cylinder, the inlet-duct provided in the walls of said cylinder for conducting gas to both inlet-valves, the high-pressure discharge-valve provided at one end of said cylinder, the low-pressure or by-pass valve arranged at the other end thereof, the discharge-duct and the by-pass both provided in the walls of said cylinder and communicating with respective valves, and, said cylinder having a plurality of intermediate internal ports connected with said by-pass and closed by said piston except during the last part of its compression-stroke in one direction and the first part of its suction-stroke in the other direction, substantially as described.

6. In a double-acting gas-compressor, the cylinder having suitable heads in combination with the inlet-valves at its ends, a high-pressure discharge-valve and a low-pressure valve, at opposite ends of said cylinder, the long piston, and said cylinder being provided with the circumferential duct 9 communicating with said intermediate valve and a plurality of internal ports 8 of less width than said duct 9, substantially as and for the purpose specified.

7. In a gas-compressor, the cylinder having thick walls, containing the inlet-duct 4 and the valve-spaces 4' 4' the duct 6 and the valve-space 6', the duct 7, the valve-space 7', the circumferential duct 9 and the internal ports 8, in combination with the valves provided in said spaces, the hoods for said spaces, the permanent gas connections, the head F, the head E containing the gland, the piston B, the piston-rod extending through said gland, and, said ports 8 being closed by said piston, except during the last part of its compression-stroke in one direction and the first part of its suction-stroke in the other direction, substantially as described.

In witness whereof I hereunto subscribe my name this 24th day of May, A. D. 1901.

THOMAS McINTYRE.

Witnesses:
A. MILLER BELFIELD,
HERBERT F. OBERGFELL.